US011960226B2

(12) United States Patent
Sasame et al.

(10) Patent No.: US 11,960,226 B2

(45) Date of Patent: Apr. 16, 2024

(54) IMAGE FORMING APPARATUS

(71) Applicant: CANON KABUSHIKI KAISHA, Tokyo (JP)

(72) Inventors: Hiroki Sasame, Tokyo (JP); Tomoo Akizuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/989,055

(22) Filed: Nov. 17, 2022

(65) Prior Publication Data

US 2023/0152740 A1 May 18, 2023

(30) Foreign Application Priority Data

Nov. 18, 2021 (JP) ................................ 2021-188231

(51) Int. Cl.

*G03G 15/00* (2006.01)

*G03G 15/16* (2006.01)

(52) U.S. Cl.

CPC ....... *G03G 15/5008* (2013.01); *G03G 15/161* (2013.01); *G03G 15/1615* (2013.01)

(58) Field of Classification Search

CPC ............. G03G 15/5008; G03G 15/161; G03G 15/1615

See application file for complete search history.

(56) References Cited

U.S. PATENT DOCUMENTS

| | | | | |
|---|---|---|---|---|
| 10,921,741 | B2 | 2/2021 | Shindo et al. | |
| 2013/0136469 | A1 * | 5/2013 | Tanaka | G03G 15/5037 399/49 |
| 2014/0119763 | A1 * | 5/2014 | Yamaura | G03G 15/0189 399/101 |
| 2021/0373453 | A1 * | 12/2021 | Okayasu | G03G 15/0266 |

FOREIGN PATENT DOCUMENTS

| | | | |
|---|---|---|---|
| JP | 3-9382 | A | 1/1991 |
| JP | 5197264 | B2 | 5/2013 |
| JP | 2015-49432 | A | 3/2015 |
| JP | 2019-194650 | A | 11/2019 |

* cited by examiner

*Primary Examiner* — Stephanie E Bloss

*Assistant Examiner* — Michael A Harrison

(74) *Attorney, Agent, or Firm* — Venable LLP

(57) ABSTRACT

An image forming apparatus includes a photosensitive member, a developing member to supply a toner to the photosensitive member at a developing portion, and a transfer member to transfer a toner image to a recording material passing through a transfer portion from the photosensitive member. In a case which the transfer is performed to a shorter width recording material and thereafter, the transfer is successively performed to a longer width recording material, a control portion controls a first back contrast formed when an area of a surface of the photosensitive member corresponding to the transfer portion through which the shorter width recording material is passing reaches the developing portion, and a second back contrast formed when an area of the surface corresponding to the transfer portion through which the longer width recording material is passing reaches the developing portion so that the second back contrast is higher than the first back contrast.

10 Claims, 7 Drawing Sheets

IMAGE FORMING APPARATUS

FIELD OF THE INVENTION AND RELATED ART

The present invention relates to an image forming apparatus that uses an electrophotographic method, such as an electrophotographic copier, an electrophotographic printer (e.g., LED printer, laser beam printer), and the like.

In an image forming apparatus using the electrophotographic method, the surface of a photosensitive member such as a rotatable photosensitive drum is uniformly charged to a predetermined potential, and the surface of the charged photosensitive member is exposed to light according to image information to form an electrostatic latent image on the photosensitive member. The electrostatic latent image formed on the photosensitive member is supplied with toner and developed to form a toner image on the photosensitive member, and the toner image formed on the photosensitive member is transferred to a sheet of paper or other recording material. The development of the electrostatic latent image on the photosensitive member is performed, for example, by the action of a developing contrast, which is the potential difference between the potential of the image forming portion (exposure portion) of the photosensitive member's surface and the developing bias applied to the developing member such as the developing roller that contacts the photosensitive member and forms the developing portion (developing nip portion). The transfer of the toner image from the photosensitive member to the recording material is performed, for example, by using a transfer member such as a transfer roller that contacts the photosensitive member to form a transfer nip portion. During the transfer process, a transfer bias of the opposite polarity to the normal charging polarity of the toner constituting the toner image is applied to the transfer member. Although the recording material is sometimes referred to as "paper," the recording material is not limited to only paper, but may also be plastic sheets, cloth, or other materials. The length of the recording material in a direction orthogonal to the feeding direction is also referred to as "paper width" (or "simply width"). Feeding the recording material and passing it through the transfer portion is also referred to as "paper feeding."

When repeatedly forming images on a rotating photosensitive member, the history of the previous image formation may affect the next image formation. For example, the charge on the photosensitive member from the transfer member in the transfer process may cause uneven charging on the surface of the photosensitive member because the surface of the photosensitive member cannot be uniformly charged to the desired potential in the next charging process. In this case, an image defect called "transfer memory" may occur due to toner being supplied from the developing member to the photosensitive member even though it is a non-image forming area (non-exposure area).

It is also known that uneven charging of the surface of the photosensitive member caused by the transfer process as described above is more likely to occur in the area corresponding to the "non-passing area" than in the area corresponding to the "passing area" in the transfer section. Here, the "passing area" refers to the area where the recording material passes in the direction orthogonal to the feeding direction of the recording material in the transfer portion, and the "non-passing area" refers to the area where the recording material does not pass in the direction orthogonal to the feeding direction of the recording material in the transfer portion. This is because the amount of electric charge given from the transfer member to the photosensitive member is greater in the non-passing area where the transfer member and the photosensitive member are in direct contact with each other than in the passing area. Therefore, for example, when a normal-size paper with a larger width than the narrow paper is fed after feeding a narrow paper with a smaller width, "transfer memory" is likely to occur in the non-passing area of the narrow paper in the normal-size paper.

The following method is known as a conventional countermeasure against "transfer memory" in the case of continuously feeding recording materials of different paper widths. That is, image formation for the subsequent recording material is started after the uneven charge generated by feeding the previous recording material is alleviated by increasing the interval between papers ("paper interval" or "sheet interval").

In addition, the method described in Japanese Patent No. 5197264 is known to alleviate uneven charging by uniformly irradiating light on photosensitive members (full exposure, pre-charging exposure) using a pre-charging exposure device with a light source such as an LED.

However, the method of increasing the interval between the subsequent paper feeds in order to alleviate uneven charging that occurred during the previous feed requires a longer paper interval. As a result, the time it takes to complete a print job may become longer, resulting in lower productivity.

In addition, pre-charge exposure requires a light source, such as an LED, and a light guide to uniformly irradiate the light emitted from the light source in a direction that is orthogonal to the moving direction of the photosensitive member's surface. As a result, the device (process cartridge or main body of the image forming apparatus) may become larger and more costly.

SUMMARY OF THE INVENTION

Therefore, the purpose of the present invention is to suppress the occurrence of "transfer memory" when continuously forming images on recording materials with different paper widths, while suppressing the adverse effects of reduced productivity, larger size, and higher cost of the apparatus.

The above-mentioned purpose is achieved with the image forming apparatus according to the present invention. In summary, the present invention comprises an image forming apparatus comprising a rotatable photosensitive member; a charging portion configured to perform a charging process of a surface of the photosensitive member; a charging voltage applying portion configured to apply a charging voltage for the charging process to the charging portion; an exposure portion configured to expose the charging processed surface of the photosensitive member and to form an electrostatic image on the photosensitive member; a developing member configured to supply a toner to the electrostatic image on the photosensitive member at a developing portion and to form a toner image on the photosensitive member; a developing voltage applying portion configured to apply a developing voltage for the developing to the developing member; a transfer member configured to form a transfer portion by contacting the photosensitive member and to transfer the toner image to a recording material passing through the transfer portion from the photosensitive member; a transfer voltage applying portion configured to apply a transfer voltage for the transfer to the transfer member; and a control portion configured to control at least one of the charging voltage applying portion, the developing voltage applying portion and the exposure portion, wherein an absolute value of a difference between a potential of a non-image portion of the surface of the photosensitive member at the developing portion and a potential of the developing voltage is defined as a back contrast, and wherein, in a case which the transfer is performed to a first recording material of which width in a direction substantially perpendicular to a feeding direction of the recording material is a first width, and thereafter, the transfer is successively performed to a second recording material of which width is a second width longer than the first width, the control portion controls a first back contrast which is the back contrast to be formed when an area of the surface of the photosensitive member corresponding to the transfer portion through which the first recording material is passing reaches the developing portion, and a second back contrast which is the back contrast to be formed when an area of the surface of the photosensitive member corresponding to the transfer portion through which the second recording material is passing reaches the developing portion so that the second back contrast is higher than the first back contrast.

Further features of the present invention will become apparent from the following description of exemplary embodiments with reference to the attached drawings.

DESCRIPTION OF THE EMBODIMENTS

The following is a more detailed description of the image forming apparatus according to the present invention in accordance with the drawings.

1. Overall Configuration and Operation of the Image Forming Apparatus

Figure 1:
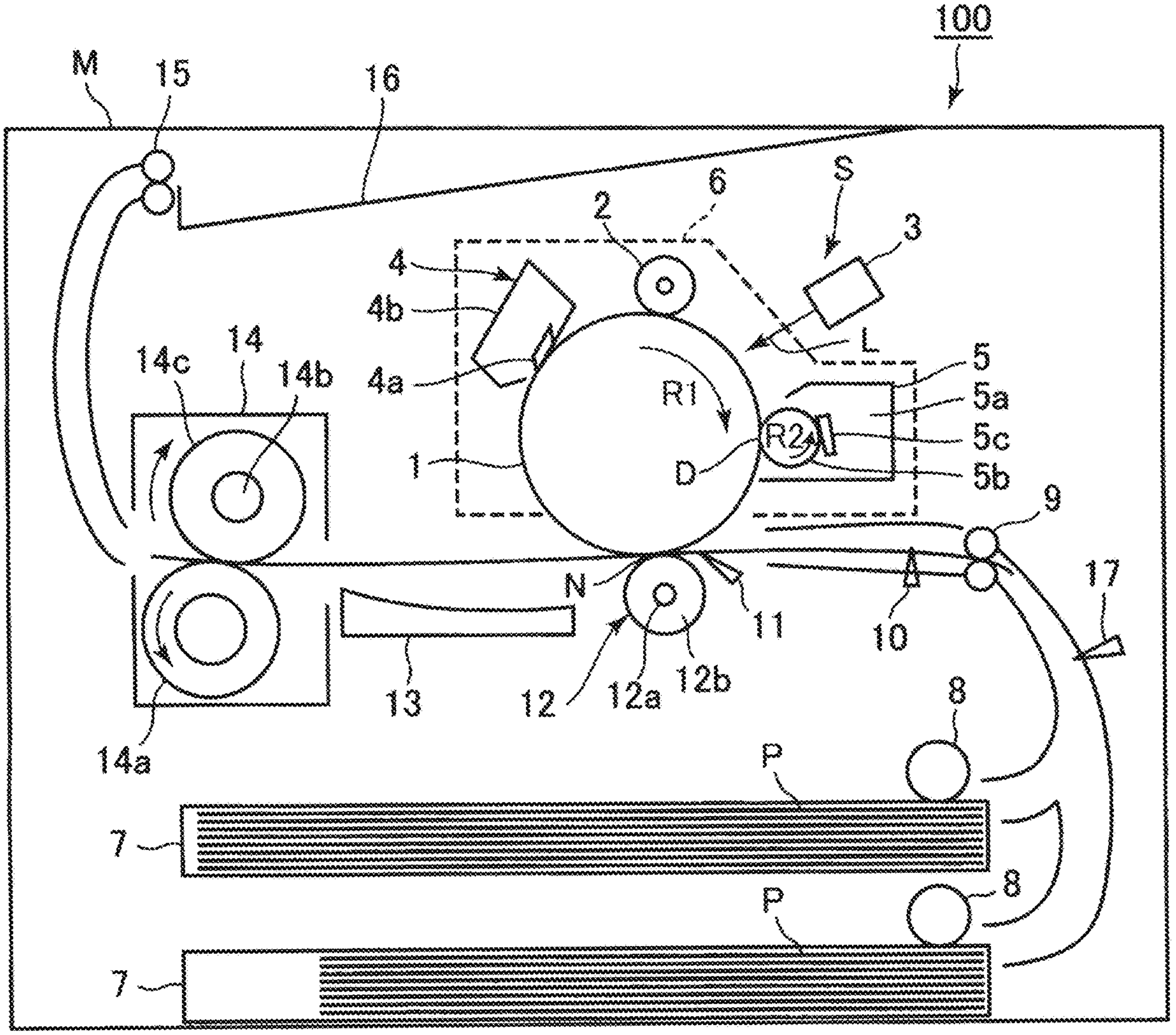
FIG. 1 is a schematic cross-sectional drawing of the image forming apparatus.

FIG. 1 is a schematic cross-sectional drawing of an image forming apparatus 100 in the present embodiment. The image forming apparatus 100 in the present embodiment is a laser beam printer using the electrophotographic method.

The image forming apparatus 100 has an image forming portion S. The image forming portion S has a photosensitive drum 1, which is a rotatable drum-type (cylindrical) photosensitive member (electrophotographic photosensitive member) as an image bearer. The photosensitive drum 1 is driven by a drive power source (not shown) in the direction of arrow R1 in FIG. 1 (clockwise direction) at a peripheral speed (process speed) of 250 mm/sec. In the image forming portion S, the photosensitive drum 1 is surrounded by a charging roller 2, an exposure device 3, a developing unit 5, and a cleaning unit 4, in order along the rotation direction of the photosensitive drum 1. In the present embodiment, the photosensitive drum 1, the charging roller 2, the developing unit 5, and the cleaning unit 4 as process means acting on the photosensitive drum 1, constitute a process cartridge 6 that can be attached to and detached from the main body of the apparatus 100M as an integral part. The image forming apparatus 100 also has a paper feeding cassette 7 at the lower part of the main body of the apparatus M, which holds a sheet of paper or other sheet-like recording material (transfer material, recording medium, sheet) P. The image forming apparatus 100 also has a feeding roller 8, a feeding roller pair 9, a top sensor 10, a pre-transfer guide 11, a transfer roller 12, a transfer guide 13, a fixing unit 14, a paper ejection roller 15, and a paper ejection tray 16, in order along the feeding path of the recording material P from the feeding cassette 7.

During image forming, the surface of the rotating photosensitive drum 1 is uniformly charged to a predetermined potential of a predetermined polarity (negative polarity in the present embodiment) by the charging roller 2, a roller-shaped charging member as the charging means (charging portion). During the charging process, a predetermined charging bias (charging voltage) is applied to the charging roller 2 by a charging power supply (high-voltage power supply) E1 (FIG. 2) as the charging voltage applying portion. The position where the charging process is performed by the charging roller 2 on the photosensitive drum 1 in the rotation direction of the photosensitive drum 1 is the charging position. In the present embodiment, the charging roller 2 charges the surface of the photosensitive drum 1 using electrical discharges that occur in at least one of the minute air gaps formed upstream and downstream of the contact portions between the charging roller 2 and the photosensitive drum 1 in the rotation direction of the photosensitive drum 1. For simplicity, however, the position on the photosensitive drum 1 that is in contact with the charging roller 2 may be considered to be the charging position.

The surface of the photosensitive drum 1 that has been charged is irradiated with a light L based on the image information by the exposure device 3 as the exposure means (exposure portion). This removes the electric charge from the exposed area on the photosensitive drum 1 to form an electrostatic latent image (electrostatic image) on the photosensitive drum 1 in accordance with the image information. In the present embodiment, the exposure device 3 is a laser scanner. This laser scanner has a spot diameter of about 60 μm on the photosensitive drum 1 and is configured to enable image formation with a resolution of 600 dpi even when the spot diameter is offset in the main scanning direction and sub-scanning direction. The main scanning direction is orthogonal to the moving direction of the surface of the photosensitive drum 1. The sub-scanning direction is parallel to the moving direction of the surface of the photosensitive drum 1 and orthogonal to the main scanning direction. The position where light is irradiated by the exposure device 3 on the photosensitive drum 1 in the rotation direction of the photosensitive drum 1 is the exposure position.

The electrostatic latent image formed on the photosensitive drum 1 is developed (visualized) by supplying toner as a developer by the developing unit 5 as the developing means, and a toner image (developer image) is formed on the photosensitive drum 1. The developing unit 5 has a developer container 5*a* that contains toner, a developing roller 5*b* as a developer carrier (developing member), and a developing blade 5*c* as a developer control member. In the present embodiment, during the development process, the developing roller 5*b* is brought into contact with the surface of the photosensitive drum 1 to form the developing portion (developing nip portion) D, which is the contact portion between the photosensitive drum 1 and the developing roller 5*b*. During the developing process, the developing roller 5*b* is driven in the rotation direction of arrow R2 (counterclockwise direction) in FIG. 1. The toner in the developer container 5*a* is supplied to the surface of the rotating developing roller 5*b*, and a frictional charging charge is applied by the developing blade 5*c* to form a toner layer on the surface of the developing roller 5*b*. During the developing process, a predetermined developing bias (developing voltage) is applied to the developing roller 5*b* by the developing power source (high voltage power source) E2 (FIG. 2) as the developing voltage applying portion. This causes toner to adhere to the electrostatic latent image on the photosensitive drum 1 in the developing portion D to form a toner image. In the present embodiment, toner charged with the same polarity as that of the photosensitive drum 1 (negative polarity in the present embodiment) adheres to the exposed area (image area) on the photosensitive drum 1 where the absolute value of potential has decreased due to exposure after being uniformly charged (reversed development method). In the present embodiment, the normal charging polarity of the toner, which is the primary charging polarity of the toner during the developing process, is negative polarity. In the present embodiment, a non-magnetic single-component developer is used as the developer. The position where toner is supplied from the developing roller 5*b* on the photosensitive drum 1 in the rotation direction (the position where the developing roller 5*b* comes into contact with the photosensitive drum 1) is the developing position, which corresponds to the position on the photosensitive drum 1 where the developing portion D is formed as described above.

Opposed to the photosensitive drum 1 is a transfer roller 12, which is a roller-shaped transfer member as a transfer means. The transfer roller 12 is pressed toward the photosensitive drum 1 to form a transfer portion (transfer nip portion) N, which is the contact portion between the photosensitive drum 1 and the transfer roller 12. The toner image formed on the photosensitive drum 1 is transferred onto the recording material P, which is nipped between the photosensitive drum 1 and the transfer roller 12 and fed by the action of the transfer roller 12 in the transfer portion N. The recording material P is stored in the feeding cassette 7 as the recording material storage portion, fed one sheet at a time by the feeding roller 8, fed by the feeding roller pair (resistor roller pair) 9, and guided by the pre-transfer guide 11 to the transfer portion N. In the present embodiment, the image forming apparatus 100 is provided with multiple feeding cassettes 7, and each feeding cassette 7 can hold different sizes of recording material P. The image forming apparatus 100 can then feed the recording material P from the feeding cassette 7 specified in the information of the print job (see below). In the present embodiment, a paper width sensor 17 as a means of detecting the paper width of the recording material P (length in a direction orthogonal to the feeding direction of the recording material P) is located in the paper feeding portion from the feeding cassette 7 to the transfer portion N. The paper width sensor 17 is installed, for example, in the feeding path from the feeding roller 8 to feeding roller pair 9. The paper width sensor 17 may also be provided in each feeding cassette 7. During the transfer process, a transfer bias (transfer voltage), which is a direct current voltage of the opposite polarity (positive polarity in the present embodiment) to the normal charging polarity of the toner (positive polarity in the present embodiment), is applied to a core metal 12*a* of the transfer roller 12 by the transfer power source (high voltage power source) E3 (FIG. 2) as the transfer voltage applying portion. As a result, the toner image on the photosensitive drum 1 is transferred to a predetermined position on the recording material P that passes through the transfer portion N. Here, the position where the toner is transferred to the recording material P on the photosensitive drum 1 in the rotation direction (the position where the transfer roller 12 contacts the photosensitive drum 1) is the transfer position, and corresponds to the position on the photosensitive drum 1 forming the transfer portion N described above.

The recording material P carrying an unfixed toner image on its surface is fed along a feeding guide 13 to a fixing unit 14 as a fixing means. The fixing unit 14 has a driving roller 14*a* and a fixing roller 14*c* that incorporates a heater 14*b*. The driving roller 14*a* presses against the fixing roller 14*c* to form a fixing portion (fixing nip portion), which is the contact portion between the driving roller 14*a* and the fixing roller 14*c*. The fixing unit 14 applies heat and pressure to the recording material P passing through the fixing portion to fix (melt and solidify) the toner image on the recording material P. After the toner image is fixed, the recording material P is ejected (output) by the paper ejection roller 15 onto the paper ejection tray 16 provided on the top surface of the main body of the apparatus M.

On the other hand, the toner that remains on the surface of the photosensitive drum 1 without being transferred to the recording material P after the transfer process (remaining transfer toner) is removed from the surface of the photosensitive drum 1 and collected by the cleaning unit 4. The cleaning unit 4 has a cleaning blade 4*a* as a cleaning member and a waste toner container 4*b*. The cleaning unit 4 scrapes off the remaining transfer toner from the surface of the rotating photosensitive drum 1 by the cleaning blade 4*a*, which contacts the surface of the photosensitive drum 1, and stores the toner in the waste toner container 4*b*. The image forming apparatus 100 in the present embodiment is not provided with a pre-charging exposure device or the like as a static eliminating means for exposing the surface of the photosensitive drum 1 after the transfer process and before the charging process to eliminate static from the surface of the photosensitive drum 1.

The photosensitive drum 1 generally consists of a photosensitive material such as OPC (organic photo semiconductor), amorphous selenium, or amorphous silicon on a drum-shaped (cylinder-shaped) substrate (conductive substrate) made of aluminum or nickel. The photosensitive drum 1 used in the present embodiment is a negatively charged OPC photosensitive member drum with an outer diameter of φ24 mm. This photosensitive drum 1 consists of a conductive substrate made of an aluminum cylinder with a photosensitive layer consisting of a charge generation layer and a charge transport layer stacked in this order from the conductive substrate side.

The transfer roller 12 is composed of a conductive base shaft (metal core) 12*a*, which also serves as a feeding electrode, and an elastic layer 12*b*, which surrounds its outer circumference in a cylindrical shape. The material of the elastic laver 13*b* is generally a semi-conductive rubber material composed of EPDM, NBR, urethane rubber, epichlorohydrin, silicone rubber, etc. The transfer roller 12 used in the present embodiment has a roller outer diameter of 14 mm, a metal core diameter of 5 mm, an elastic layer thickness of 4.5 mm, and a hardness of 30° (Asker C hardness). The transfer roller 12 consists of a metal core 12*a* made of SUS (stainless steel) and the elastic laver 12*b* made of a rubber material mixed with NBR and epichlorohydrin.

In the present embodiment, the pressure (contact pressure) of the transfer roller 12 against the photosensitive drum 1 is 9.8 N (1 kgf).

In the present embodiment, during image formation, the surface of the photosensitive drum 1 is uniformly charged to a surface potential of −500 V (non-image portion potential, non-exposure portion potential, dark portion potential, and charging potential) by the charging roller 2. In the present embodiment, the surface potential of photosensitive drum 1 (image portion potential, exposed portion potential, bright portion potential) is approximately −125 V after it has been uniformly charged and exposed with a laser by the exposure device 3. Due to the contrast between the non-image portion potential and the image portion potential, an electrostatic latent image (electrostatic image) is formed on the photosensitive drum 1, with the non-image portion potential as the non-image portion and the image portion potential as the image portion. In the present embodiment, the toner is charged negatively in the developing unit 5. In this embodiment, a DC voltage of −375 V is applied to the developing roller 5*b* as a developing bias during image formation. In the present embodiment, during image formation, a DC voltage of +2500V, for example, is applied to the transfer roller 12 as a transfer bias.

Although a negatively charged toner is used in the present embodiment, the present invention is not limited to this manner. The present invention can also be applied when a toner with a positive polarity is used. When a toner with normal charging polarity is used, for example, the surface of photosensitive drum 1 is uniformly charged with positive polarity (reversed development method), and a negative transfer bias is applied to the transfer roller 12 during the transfer process. The relationship of the voltage and potential (high and low) with respect to the charging bias, development bias, and transfer bias when using a toner with normal charging polarity of positive polarity is roughly the opposite of that described in the present embodiment. A person skilled in this field can set these voltages and potentials in the case of using a toner with positive polarity based on the disclosure herein as appropriate.

Figure 2:
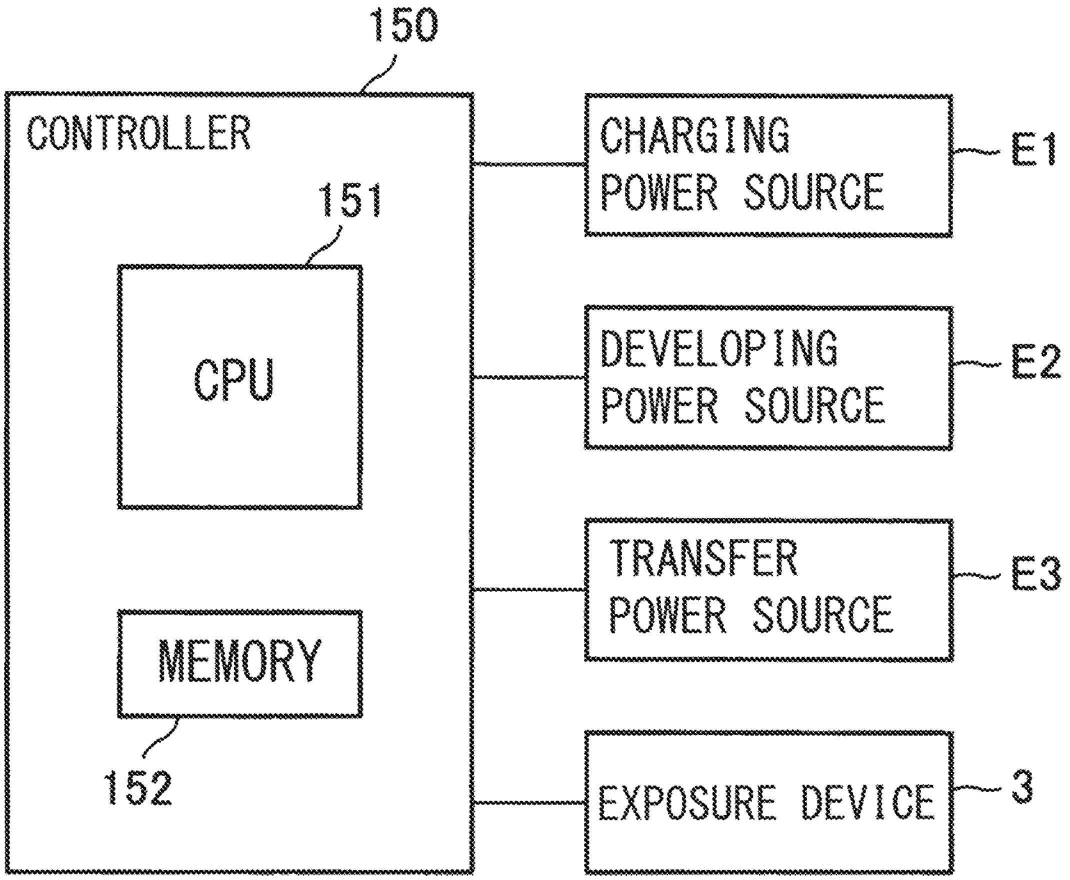
FIG. 2 is a schematic block diagram showing the control portion of the image forming apparatus.

FIG. 2 is a schematic block diagram showing the control portion of the key parts of the image forming apparatus 100 in the present embodiment. The image forming apparatus 100 has a control portion 150. The control portion 150 has a CPU 151 as a central element that performs arithmetic processing, a memory (storage element) such as a ROM and RAM 152 as a storage means, and an input/output portion (not shown) that controls the exchange and reception of signals between various elements connected to the control portion 150. The RAM stores sensor detection results, calculation results, etc., while the ROM stores control programs, pre-determined data tables, etc.

The control portion 150 is a control means capable of comprehensively controlling the operations of the image forming apparatus 100. The control portion 150 executes a predetermined image forming sequence by controlling transfer of various electrical information signals, timing of driving portions, and so on. Each portion of the image forming apparatus 100 is connected to the control portion 150. For example, in relation to the present embodiment, the control portion 150 is connected to a charging power source E1, a developing power source E2, a transfer power source E3, the exposure unit 3, a paper width sensor 17, and so on. The control portion 150 controls the ON/OFF and output values of the various power sources E1, E2, and E3, the amount of exposure light by the exposure device 3, etc., based on signals (detection signals) input from the various sensors such as the paper width sensor 17, etc., to control image forming and other operations.

The image forming apparatus 100 is capable of executing a print job (print operation, printing operation), which is a series of operations to form images on a single or multiple recording materials P initiated by a single start instruction. In the present embodiment, the start instruction is input to the image forming apparatus 100 from an external device such as a personal computer (not shown). A print job generally has an image forming process (printing process), a pre-rotation process, sheet interval process when images are formed on multiple recording materials P, and a post-rotation process. The image forming process is the period during which an electrostatic latent image is actually formed on the photosensitive drum 1, the electrostatic latent image is developed (toner image formation), the toner image is transferred, and the toner image is fixed, etc. The image forming time refers to this period. More precisely, the timing of image forming time differs depending on the position at which these processes of forming the electrostatic latent image, forming the toner image, transferring the toner image, and fixing the toner image are performed. The pre-rotation process is a period of preparation operations before the image forming process. The sheet interval process (between-image process) is a period of time corresponding to the interval between the recording materials P and P when the image forming process is continuously performed for multiple recording materials P (during continuous image forming). The post-rotation process is a period of time during which organizing operations (preparation operations) are performed after an image forming process. The non-image forming time is a period other than the image forming time, and includes the above-mentioned pre-rotation process, sheet interval process, and post-rotation process, as well as the pre-multi-rotation process, which is a preparation operation when the image forming apparatus 100 is turned on or returns from sleep mode.

2. Method of Measuring the Volume Resistance of the Transfer Roller

Figure 3:
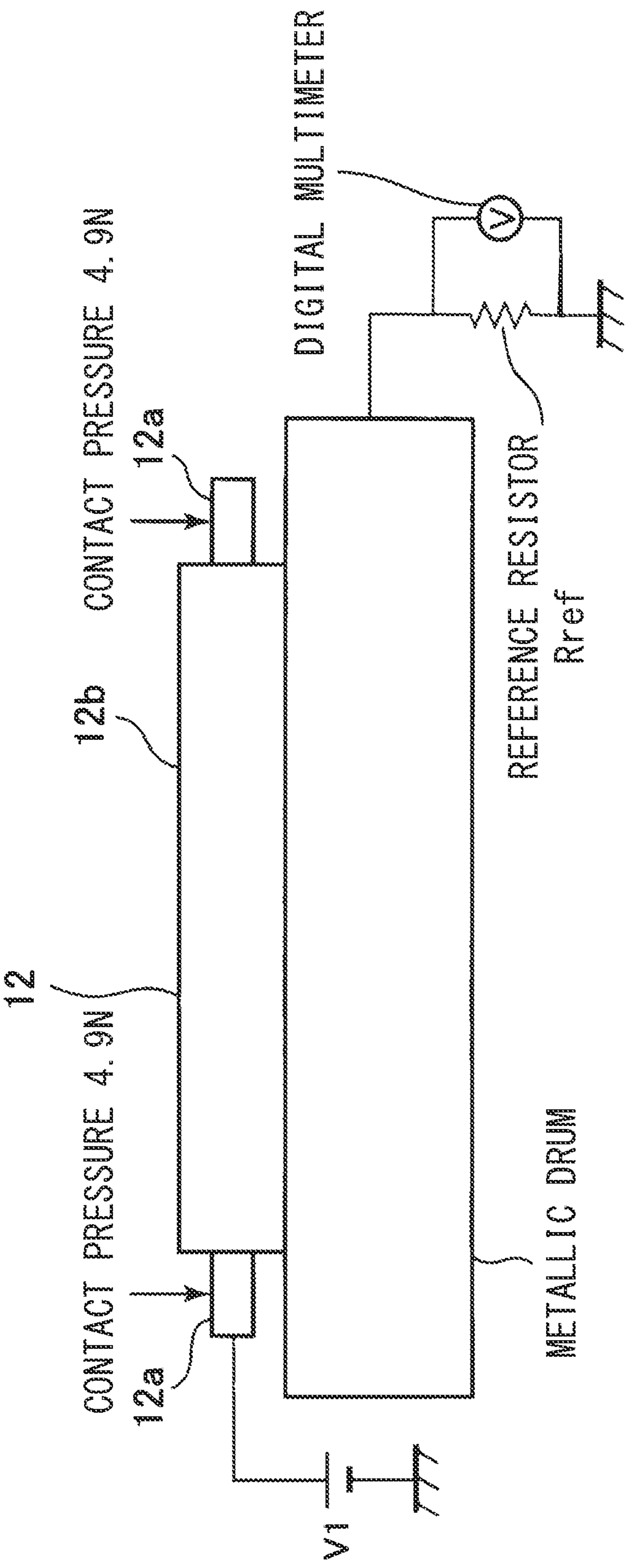
FIG. 3 is a schematic drawing of a device for measuring the electrical resistance of the transfer roller.

Next, a method for measuring the volume resistance of a transfer roller 12 is described. FIG. 3 is a schematic drawing of a measurement system for the volume resistance of the transfer roller 12. The measurement environment is set at a temperature and humidity of 23° C./50%.

Both ends of a metal core 12*a* of the transfer roller 12 about the rotation direction of the transfer roller 12 are pressed with 4.9 N each to press the transfer roller 12 against a metal drum with a pressure contact pressure of 9.8 N. A voltage Vref applied to a standard resistance Rref when a voltage V1 is applied to the metal core 12*a* of the transfer roller 12 is measured with a digital multimeter (FLUK Co., Ltd.). Assuming that the applied voltage V1 to the metal core 12*a* of the transfer roller 12 is 1000 V and the standard resistance Rref is 1000Ω, the voltage applied to the standard resistance Rref from 10 sec after the voltage is applied to the metal core 12*a* of the transfer roller 12 is measured, and the average value over the 10 sec measurement time is Vref. Let Iref be the current value flowing through the standard resistance Rref, Vrol be the voltage applied to the transfer roller 12, and Irol be the current flowing through the transfer roller 12. In this case, the volume resistance Rm of the transfer roller 12 is obtained by the following Formula.

$$Rm = \text{Vrol}/\text{Irol} \quad \text{(Formula 1)}$$

Vrol and Irol can be obtained with the following Formulas:

$$\mathrm{Vrol}=V1-\mathrm{Vref} \quad \text{(Formula 2)}$$

$$\mathrm{Irol}=\mathrm{Vref}/\mathrm{Rref} \quad \text{(Formula 3)}$$

Inserting Formulas 2 and 3 into Formula 1, results in:

$$Rm=(V1-\mathrm{Vref})\times\mathrm{Rref}/\mathrm{Vref} \quad \text{(Formula 4)}$$

Therefore, based on Formula 4, the volume resistance Rm of the transfer roller 5 can be obtained from Vref measured by the measurement method described above.

In the present embodiment, the volume resistance Rm of the transfer roller 12 is suitable in the range of $1.0\times10^6$ to $5.0\times10^9\Omega$ from the perspective of transferability and other factors. In the present embodiment, a transfer roller 12 with a volume resistance Rm of $1.0\times10^7\Omega$ was used.

3. Transfer Memory

Next, the mechanism of occurrence of "transfer memory" is explained. First, the surface potential of the photosensitive drum 1 before and after passing through the transfer portion N is explained. In the present embodiment, the surface of the photosensitive drum 1 is uniformly charged to −500 V by the charging roller 2. In the present embodiment, the non-image portion potential of the surface of the photosensitive drum 1 is maintained at about −500 V even immediately before passing through the transfer portion N. In the present embodiment, in the transfer portion N, a positive polarity voltage (transfer bias) is applied to the transfer roller 12, and a positive polarity charge is given from the transfer roller 12 to the photosensitive drum 1. Therefore, the surface potential of the photosensitive drum 1 after passing through the transfer portion N (non-image portion potential) becomes higher than −500 V (higher on the side of the opposite polarity to the normal charging polarity of the toner). At this time, a charge of positive polarity may be given from the transfer roller 12 to the photosensitive drum 1 to the extent that the surface potential of the photosensitive drum 1 (non-image portion potential) becomes locally positive. In such cases, the surface of the photosensitive drum 1 cannot be uniformly charged to −500 V during the next charging process, and uneven charging may occur on the surface of the photosensitive drum 1.

In the present embodiment, a developing bias of −375 V is applied to the developing roller 5*b*. For example, if the surface potential of the unevenly charged portion of the surface of the photosensitive drum 1 above is higher than −375V, then the surface potential is higher than the potential of the developing bias. In this case, toner is supplied from the developing roller 5*b* to the photosensitive drum 1 even though it is a non-image portion (non-exposure portion). The toner supplied to the photosensitive drum 1 is transferred onto the recording material P in the transfer portion N. Thus, the history of the electric potential on the photosensitive drum 1 generated during the previous transfer process affects the next image forming process, and an image defect called "transfer memory" may occur.

Even when the potential of the non-image portion is lower than the potential of the developing bias, some toner may be supplied from the developing roller 5*b* to the photosensitive drum 1 if the absolute value of the difference between the potential of the non-image portion and the potential of the developing roller is small. This phenomenon is apt to occur in the image forming apparatus 100 that employs the "contact developing method" in which the developing roller 5*b* contacts the photosensitive drum 1 to form a developing portion D.

Uneven charging, which is a factor of "transfer memory," is more likely to occur in the area corresponding to the "non-passing area" in the transfer portion N than in the area corresponding to the "passing area" in the transfer portion N. This is because the current flowing from the transfer roller 12 to the photosensitive drum 1 in the non-passing area of the transfer portion N is higher than that in the passing area of the transfer portion N. This is because the current flowing from the transfer roller 12 to the photosensitive drum 1 is higher in the non-passing area where the transfer roller 12 and the photosensitive drum 1 are in direct contact than in the passing area in the transfer portion N. When the electrical resistance of the recording material P is high, such as paper with a large basis weight, or when the volume resistance of the transfer roller 12 is low, the current flows more easily in the non-passing area.

4. Transfer Memory for Continuous Feeding of Recording Materials with Different Paper Widths One printing condition (feeding condition) under which "transfer memory" is likely to occur is when recording materials P with different paper widths are fed consecutively. The occurrence of "transfer memory" in this case is explained below.

Figure 4:
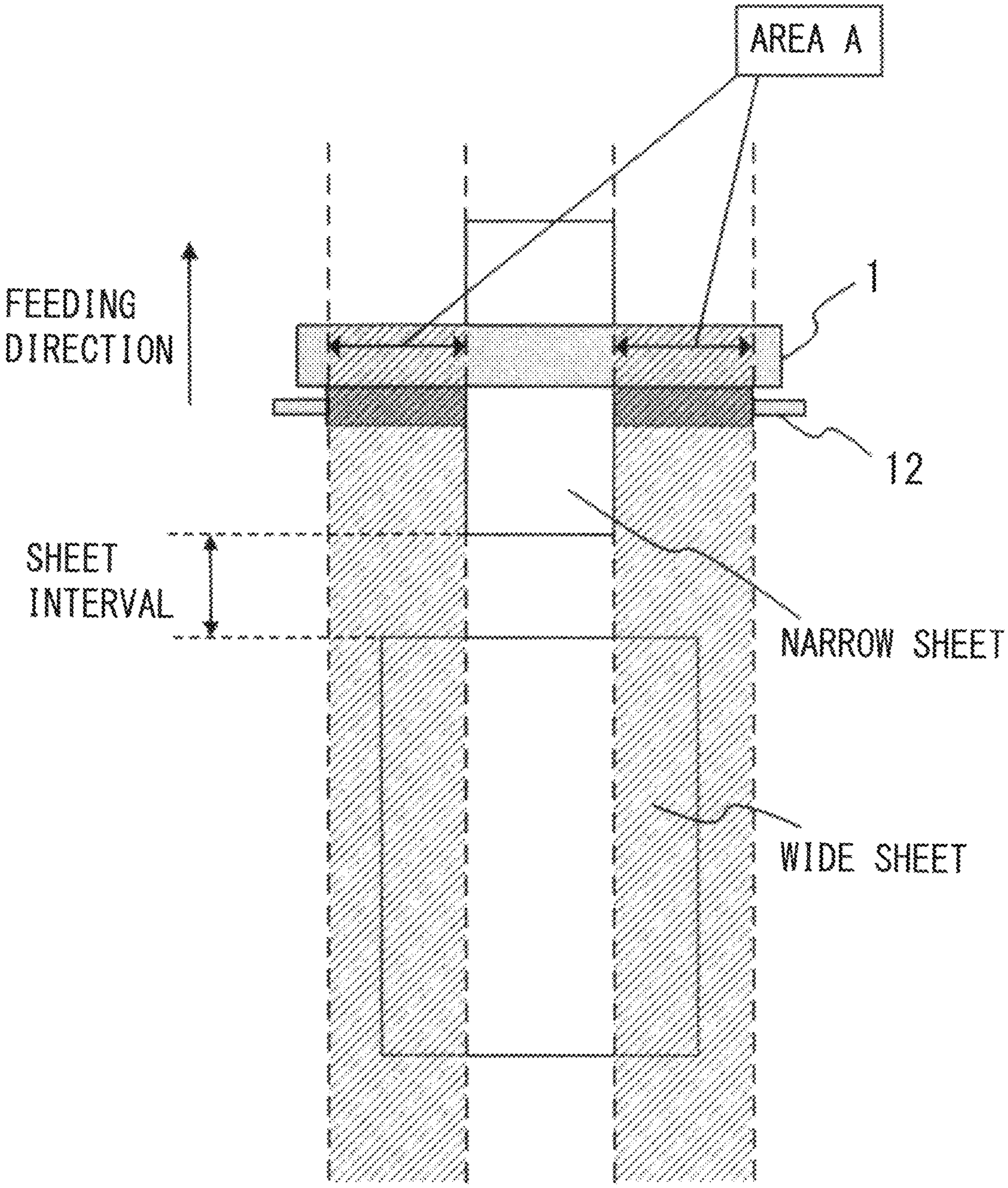
FIG. 4 is a schematic drawing showing the transfer portion to explain Embodiment 1.

FIG. 4 is a schematic drawing showing the transfer portion N in the case where a narrow-width recording material P and a wide-width recording material P are fed consecutively in that order. Area A in FIG. 4 is the area on the photosensitive drum 1 corresponding to the non-passing area in the transfer portion N when the narrow-width recording material P is fed, with respect to the direction orthogonal to the feeding direction of the recording material P in the transfer portion N. As mentioned above, this area A is an area where uneven charging tends to occur. In this area A, some toner may be supplied from the developing roller 5*b* to the photosensitive drum 1 even though it is a non-passing area (non-exposure area) during the image forming process for the next wide-width recording material P. Due to the uneven charging that occurs when a narrow-width recording material P is fed, the toner may be supplied to the photosensitive drum 1 from the developing roller 5*b* even though it is a non-passing area (non-exposure area). In this situation, when the above narrow-width recording material P is followed by a wide-width recording material P, the toner supplied to the photosensitive drum 1 is transferred onto the wide-width recording material P, causing a "transfer memory" to become apparent.

Conventionally, as a countermeasure against "transfer memory" when continuously feeding recording materials P of different paper widths, a method is known to mitigate uneven charging by repeating the charging process before feeding a wide-width recording material P. If the paper interval between the preceding and subsequent papers ("sheet interval") is longer than the circumferential length of the photosensitive drum 1, the charging process can be performed at least twice or more for the history of the potential on the photosensitive drum 1 generated in the transfer process to be mitigated. For example, if the sheet interval is twice the circumferential length of the photosensitive drum 1, the charging process can be performed three times. By repeating the charging process in this manner, the history of the electric potential on the photosensitive drum 1 generated in the transfer process can be mitigated. This can alleviate the uneven charging described above.

However, this method requires a longer paper interval, which increases the time required for one print job and may reduce productivity.

There is also a known method to alleviate uneven charging by uniformly irradiating light on the photosensitive drum 1 (full exposure, pre-charging exposure) using a pre-charging exposure device with a light source such as LED. However, this method requires a light source such as LEDs and a light guide, which may lead to larger equipment and higher costs.

Therefore, it is desirable to suppress the occurrence of "transfer memory" when continuously forming images on recording materials P of different paper widths, while controlling the adverse effects of the conventional method, such as reduced productivity, larger size and higher cost of the equipment.

Therefore, in the present embodiment, when recording materials P of different paper widths are continuously fed, the occurrence of "transfer memory" is suppressed by changing the back contrast, as described below, to enable good image formation without image defects. The following is a more detailed explanation.

5. Back Contrast Transfer Memory Countermeasure

Next, a method for suppressing "transfer memory" in the present embodiment when recording materials P of different paper widths are continuously fed is described.

In the present embodiment, the control unit 150 controls the "back contrast (Vb)," which is the absolute value of the difference between the potential of the non-passing area of the surface of the photosensitive drum 1 and the potential of the developing bias in the developing area D, to be increased when recording materials P of different paper widths are continuously fed. This makes it possible to suppress the occurrence of "transfer memory" in the case of continuous image forming on recording materials P with different paper widths, while suppressing the adverse effects of reduced productivity, larger size and higher cost of the apparatus, and the like.

Figure 5:
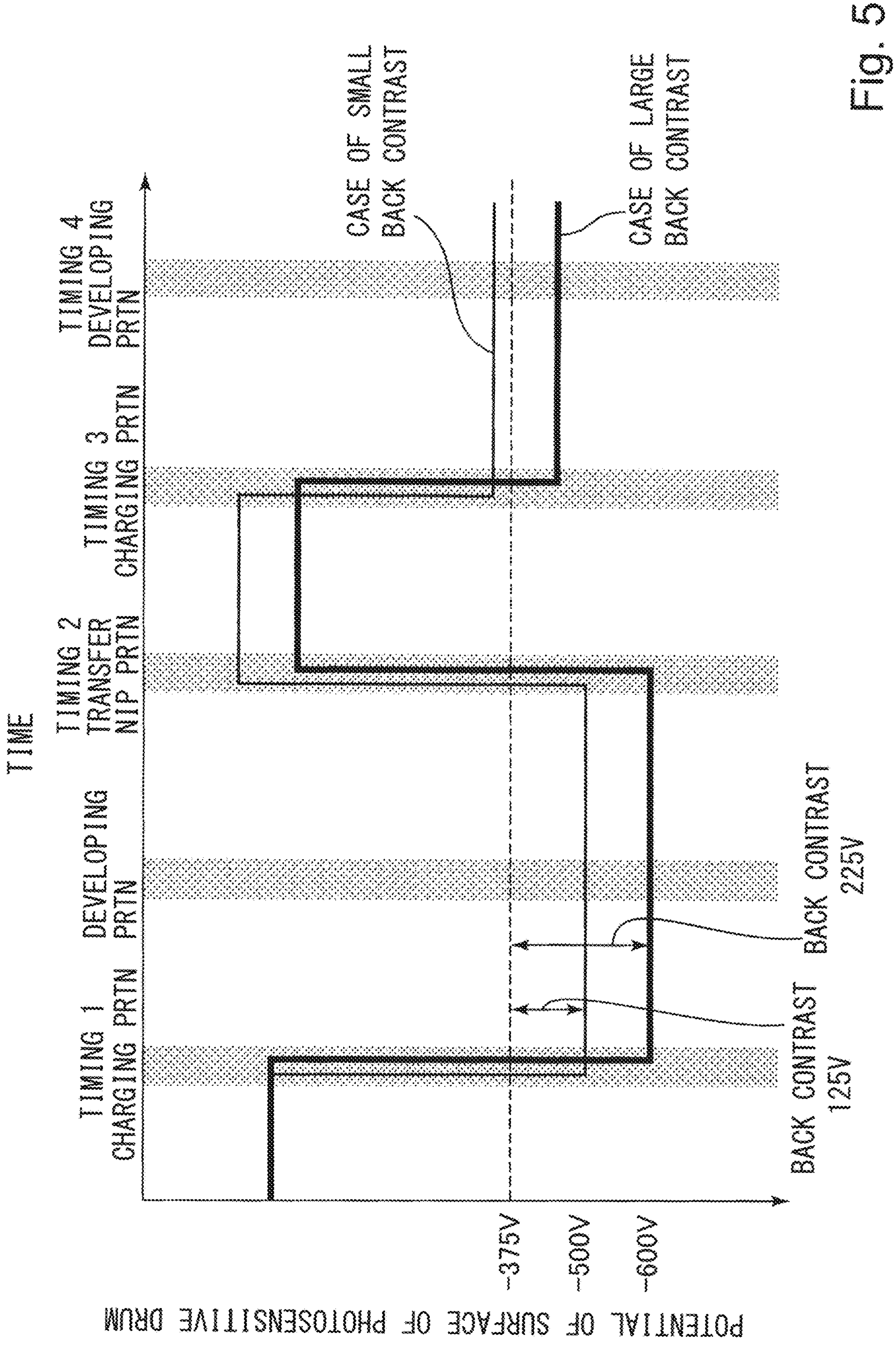
FIG. 5 is a graph showing an example of the change in the surface potential of the photosensitive drum.

FIG. 5 is a comparative example of a certain part of the surface of the photosensitive drum 1, showing the transition of the surface potential of that part in comparison with a small back contrast and a large back contrast.

First, at a time point 1 in FIG. 5, the surface of the photosensitive drum 1 is charged by the charging roller 2. When the back contrast is small, the surface of the photosensitive drum 1 is charged to −500 V. When the back contrast is large, the surface of the photosensitive drum 1 is charged to −600 V. The potential of the developing bias is set to −375V. Thus, the back contrast is 125 V when the back contrast is small and 225 V when it is large. In the present embodiment, as an example, a DC voltage of −1000 V is applied to the charging roller 2 as the charging bias when the back contrast is small, and a DC voltage of −100 V is applied to the charging roller 2 as the charging bias when the back contrast is large. When the back contrast is large, a DC voltage of −1100 V is applied to the charging roller 2 as the charging bias.

Next, at the time point 2 in FIG. 5, the surface potential of the photosensitive drum 1 becomes high as it passes through the transfer portion N.

Next, at time point 3 in FIG. 5, the surface of the photosensitive drum 1 is charged again by the charging roller 2. At this time, as shown in FIG. 5, the surface of the photosensitive drum 1 after the charging process may not fall to the desired non-image potential. This localized area on the surface of the photosensitive drum 1 where the potential after the charging process is higher than the desired non-image portion potential is the area of uneven charging that becomes a factor of "transfer memory."

Next, time point 4 in FIG. 5 is when the above unevenly charged portion passes through the developing portion D. The surface potential of the photosensitive drum 1 at this time is compared between the case where the back contrast is small and the case where the back contrast is large. When the back contrast is small, the surface potential of the photosensitive drum 1 is −375 V or higher, which is larger than the potential of the developing bias. Therefore, toner is supplied from the developing roller **5*b* to the photosensitive drum 1. On the other hand, when the back contrast is large, the surface potential of the photosensitive drum 1 is lower than −475 V, which is lower than the potential of the developing bias, and there is a sufficient potential difference that toner is not supplied from the developing roller 5*b* to the photosensitive drum 1. Therefore, no toner is supplied from the developing roller 5*b* to the photosensitive drum 1**.

In other words, when the back contrast is large, the occurrence of "transfer memory" can be suppressed, although uneven charging remains.

However, it is necessary to consider "fogging" and "deterioration of one-dot reproducibility" as adverse effects of increasing the back contrast. This point is explained next.

"Fogging" is a phenomenon in which the toner charged with negative polarity on the developing roller **5*b* is reversed to positive polarity in the developing portion D, causing the toner to be supplied to the non-image portion on the photosensitive drum 1. This toner whose polarity is reversed to positive is not transferred onto the recording material P in the transfer portion N, but is collected by the cleaning unit 4. Therefore, this "fogging" increases toner consumption, although image defects are unlikely to occur. The size of the back contrast is related to the factor that causes the polarity of the toner on the developing roller 5*b*** to be inverted, and it is known that the larger the back contrast, the easier it is for the toner polarity to be inverted.

"Deterioration of one-dot reproducibility" is a phenomenon in which the reproducibility of the toner image in the development process deteriorates in relation to the electrostatic latent image formed on the surface of the photosensitive drum 1. In particular, the reproducibility of toner images tends to deteriorate in halftone images formed with a single dot and line images with a single dot width. This is because an electrostatic latent image with a small image area, such as a one-dot image, is easily affected by the electric field in the surrounding non-image area. Since the larger the back contrast, the stronger the electric field in the non-image area, it is known that the larger the back contrast, the more likely it is that the reproducibility of a one-dot image will deteriorate.

In view of the above, it is desirable to control the back contrast in the following manner. That is, under print conditions where "transfer memory" is unlikely to occur, the back contrast should be reduced in order to suppress "fogging" and "deterioration of one-dot reproducibility." In print conditions where "transfer memory" is likely to occur, the back contrast should be increased in order to suppress "transfer memory."

Therefore, in the present embodiment, the control portion 150 controls to increase the back contrast when feeding a narrow-width recording material P and a wide-width recording material P in succession in this order, so that the back contrast when feeding the wide-width recording material P is increased.

6. Confirmation of Effectiveness

Next, an evaluation experiment that confirmed the effectiveness of the present embodiment is described.

The evaluation conditions are as follows. As recording materials P (paper), CS-068 (manufactured by Canon) of B5 size with a basis weight of 68 g/m$^2$, and Vitality (manufactured by Xerox) of LTR size with a basis weight of 75 g/m$^2$ were used. The above B5 size recording material P is referred to as "B5 size paper" and the above LTR size recording material P is referred to as "LTR size paper." These recording materials P were left in an environment with a temperature of 15° C. and a humidity of 10% for 2 days, and were used with a moisture content of 3% as measured with a microwave moisture meter Moistrex MX8000 (manufactured by NDC Infrared Engineering Ltd.). The image forming apparatus 100 was installed in an environment with a temperature of 15° C. and a humidity of 10%, and print operations were performed in that environment. The transfer bias applied to the transfer roller 12 when the recording material P was fed to the transfer portion N was +2500V. The feeding speed of the recording material P was 250 mm/sec. the print speed was 40 sheets/min, and the print operation was performed with 50 mm paper intervals.

One set of a print job consisted of consecutive feeding operations in the order of B5 size paper and LTR size paper, and an image with a one-dot horizontal line (a line extending in the main scanning direction) placed at intervals of 50 spaces (dots) was printed on the LTR size paper. When printing on the B5 size paper, the developing bias potential was set at −375 V, the non-image portion potential after the charging process was set at −500 V, and the back contrast was set at 125 V. When printing on the LTR size paper, the developing bias potential was set at −375 V. and the back contrast was checked by changing the condition of the back contrast by changing the potential of the non-image portion after the electrification process. In this case, the back contrast was changed to 125V, 150V, 175V, 200V, 225V, and 250V.

The presence or absence of "transfer memory" and "one-dot reproducibility (whether or not a one-dot horizontal line image can be reproduced without chips or other defects)" were then checked on the LTR size paper. The "transfer memory" was evaluated as "X" (poor) when the associated image defect occurred, and as "O" (good) when it did not occur. For "one-dot reproducibility," the case where the one-dot horizontal line image had a defect such as a chip was evaluated as X (defective), and the case where the image was reproduced without such defects was evaluated as O (good). The results of the evaluation experiment are shown in Table 1.

TABLE 1

| Condition | Post-charge potential | Back contrast | Transfer memory | One-dot reproducibility |
|---|---|---|---|---|
| 1 | 500 V | 125 V | X | O |
| 2 | 525 V | 150 V | X | O |
| 3 | 550 V | 175 V | O | O |
| 4 | 575 V | 200 V | O | O |
| 5 | 600 V | 225 V | O | O |
| 6 | 625 V | 250 V | O | X |

As shown in Table 1, under the print conditions where "transfer memory" is likely to occur, the occurrence of "transfer memory" in the wide-width recording material P was suppressed when the back contrast was 175 V or higher. The printing condition under which "transfer memory" is likely to occur is when feeding a wide-width recording material P when narrow-width recording material P and wide-width recording material P are continuously fed in this order. When the back contrast was 250 V or higher, the "one-dot reproducibility" deteriorated. In other words, to obtain good one-dot reproducibility while suppressing the occurrence of "transfer memory," the back contrast should be set to 175 V or higher and 225 V or lower.

As mentioned above, the back contrast is correlated with fogging, and the larger the back contrast, the worse the fogging may become. Therefore, in order to suppress fogging while suppressing "transfer memory," it is preferable to set the back contrast as small as possible within the range where "transfer memory" can be suppressed.

Therefore, in the present embodiment, the control portion 150 controls the back contrast to be set to 175 V when feeding the narrow-width recording material P and the wide-width recording material P in this order in succession, and when feeding the wide-width recording material P. In other words, in the present embodiment, the control unit 150 controls the charging bias and controls the non-image portion potential after the charging process so that the back contrast is set to such a value. In this way, "transfer memory" can be suppressed while maintaining "one-dot reproducibility" and suppressing "fogging" even under printing conditions where "transfer memory" is likely to occur.

Under print conditions where "transfer memory" is unlikely to occur, it is preferable to set the back contrast as small as possible from the viewpoint of improving "one-dot reproducibility" and suppressing "fogging." Therefore, in the present embodiment, the control portion 150 controls the back contrast to be set to 125 V in print conditions other than those where the above "transfer memory" is likely to occur. In other words, in this embodiment, the control unit 150 controls the non-image portion potential after the charging process by controlling the charging bias so that the back contrast is set to such a value. In this way, the print operation can be performed under print conditions where "transfer memory" is unlikely to occur, which is advantageous for improving "one-dot reproducibility" and suppressing "fogging" as much as possible. The print conditions under which "transfer memory" is unlikely to occur are any print conditions other than the print conditions under which the above "transfer memory" is likely to occur, including when feeding narrow-width recording material P when narrow-width recording material P and wide-width recording material P are fed continuously in this order. In the present embodiment, the print condition under which the above "transfer memory" is apt to occur is when the wide recording material P is fed when the narrow-width recording material P and the wide recording material P are fed consecutively in this order.

7. Operation Steps

Figure 6:
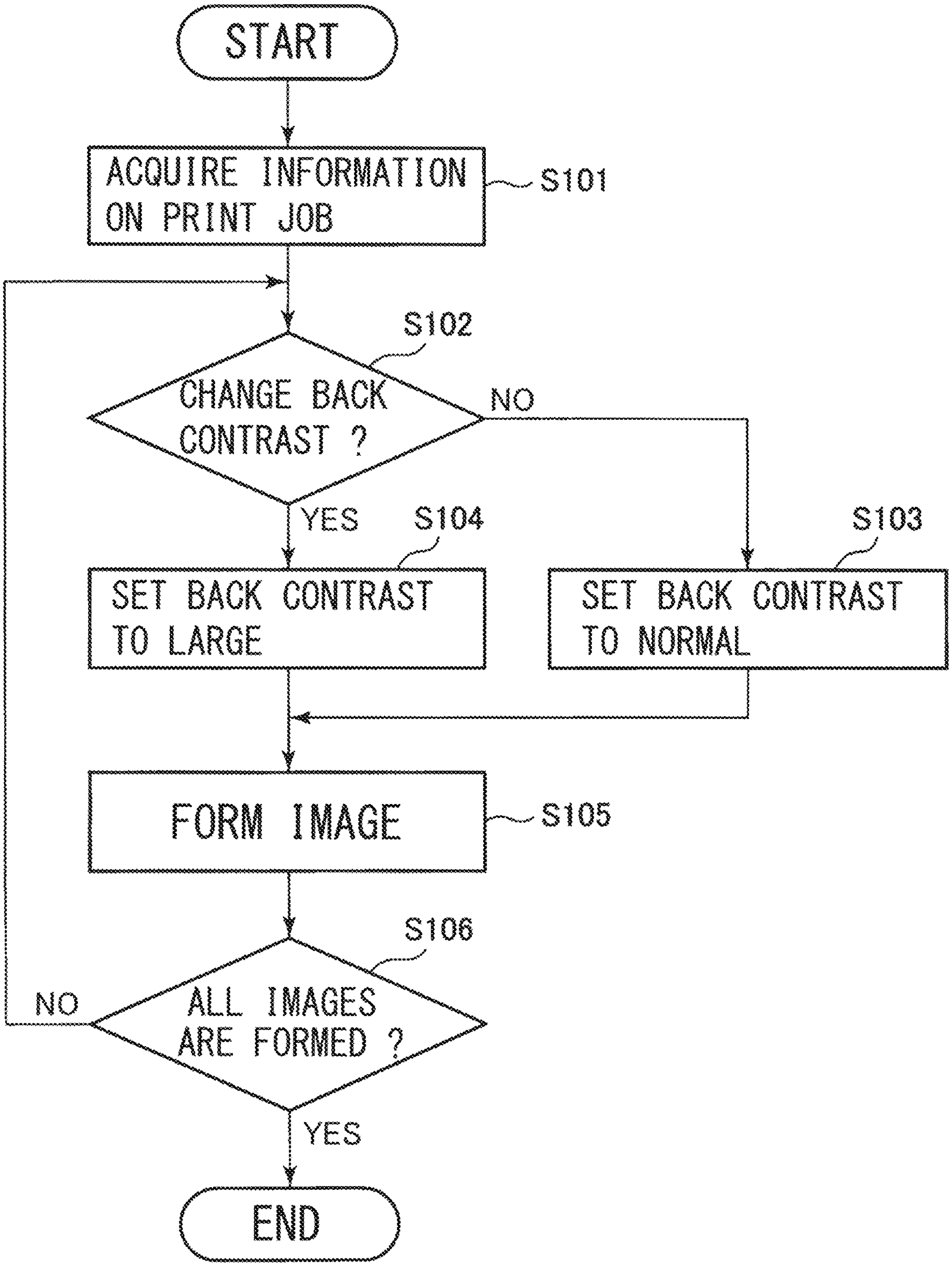
FIG. 6 is a flowchart showing an example of a print job procedure.

FIG. 6 is a flowchart showing the outline of the steps of a print job according to the present embodiment.

Here, it is assumed that control is performed to increase the back contrast when feeding the wide-width recording material P when narrow-width recording material P and wide-width recording material P are continuously fed in this order in a single print job.

First, the control portion 150 obtains information about the print job from the external device (S101).

Next, the control portion 150 determines whether control to increase the back contrast is necessary (S102). As described above, the example here is a case in which control to increase the back contrast is performed when recording materials P of different paper widths in a single print job are fed continuously. Therefore, the control portion 150 determines that the control to increase the back contrast is not necessary ("No") in S102 for the image forming on the first recording material P of the print job. In this case, the control portion 150 sets the process conditions that result in a normal back contrast (S103) and performs the image forming (S105). Next, the control portion 150 determines whether or not all image forming conditions specified in the print job in question have been completed (S106). If the control portion 150 determines in S106 that all image forming processes have been completed ("Yes"), the print job is terminated. On the other hand, if the control portion 150 determines in S106 that all image forming processes are not finished ("No"), it returns to the process in S102.

In S102, the control portion 150 determines that control to increase the back contrast is necessary ("Yes") when the paper width of the recording material P for this image forming is larger than the paper width of the recording material P for the previous image forming. Here, the control portion 150 can make the above judgment based on the size information of each recording material P to be used for image forming in the job, which is included in the print job information input from an external device and stored in a memory 152. The image forming apparatus 100 is provided with a paper width sensor 17 so that the paper width of the recording material P that is actually fed can be detected. The control portion 150 may make the above judgment based on the detection results of the paper width of the recording material P that was last used for image forming, which is detected by the paper width sensor 17 and stored in the memory 152, and the detection results of the paper width of the recording material P to be used this time. The above judgment may also be made using both the information of the print job and the detection results of the paper width sensor 17.

For example, when the width of the recording material P based on the information of the print job and the width of the recording material P based on the detection result of the paper width sensor 17 are different, the above judgment can be made based on the width of the recording material P based on the detection result of the paper width sensor 17.

If the control portion 150 determines in S102 that control to increase the back contrast is necessary ("Yes"), it sets process conditions that result in a larger back contrast than the regular back contrast described above (S104). Here, the back contrast in the area of the surface of the photosensitive drum 1 related to the rotation direction of the photosensitive drum 1 where the recording material P passed through the transfer portion N when the previous image forming portion P passed through the transfer portion N is defined as the first back contrast. The back contrast in the area of the surface of the photosensitive drum 1 related to the rotation direction of the photosensitive drum 1 that passes through the transfer portion N when the recording material P for which image forming portion P is to be performed this time passes through the transfer portion N is the second back contrast. In this embodiment, the control unit 150 changes the non-image portion potential of the surface of the photosensitive drum 1 after the charging process by changing the charging bias during the period of the paper interval at the charging position so that the second back contrast is larger than the first back contrast. Then, the control portion 150 performs image forming (S105).

Thereafter, the control portion 150 terminates the print job in the same manner as described above when all image forming processes specified in that print job have been completed, and returns to the process of S102 when all image forming processes have not been completed. In the present embodiment, the control area 150 controls the back contrast to be increased by one sheet of the recording material P after switching the back contrast, when a narrow-width recording material P and a wide-width recording material P are fed consecutively in this order. Therefore, when image forming is continuously performed on a recording material P with a paper width less than or equal to the paper width of the recording material P when the back contrast is switched, it is determined in S102 again that control to increase the back contrast is not necessary. Then, in S103, the process conditions are set to the regular back contrast described above. However, the present invention is not limited to such an arrangement. Depending on the configuration of the image forming apparatus 100, there may be a case in which the charging process for one sheet of recording material P is not sufficient to alleviate the uneven charging caused by image forming on a narrow-width recording material P. In such a case, the uneven charging may be caused by the narrow width of the recording material P. In such a case, the charging process for one sheet of recording material P may be sufficient to alleviate the uneven charging. In such a case, the back contrast may be controlled to be increased over multiple sheets of recording material P after switching the back contrast, which is preset to mitigate the uneven charging. These multiple sheets of recording material P are those with a paper width greater than the paper width of the recording material P before switching the back contrast and less than the paper width of the recording material P when the back contrast is switched.

The explanation here assumes that control is performed to increase the back contrast when feeding wide-width recording material P in the case where narrow-width and wide-width recording materials P are fed consecutively in this order in one print job. However, the printing conditions under which "transfer memory" is likely to occur are not limited to when feeding wide-width recording material P where narrow-width recording material P and wide-width recording materials P are fed consecutively in this order in a single print job. For example, information on multiple print jobs input to the image forming apparatus 100 from a single or multiple external devices connected to the image forming apparatus 100 may be stored in the memory 152 or the like, and multiple print jobs may be performed in succession. In this case, the paper interval between the last recording material P of the preceding print job and the first recording material P of the subsequent print job may be equal to the paper interval in one print job. In this case, even between print jobs, "transfer memory" is a printing condition that is prone to occur when feeding wide-width recording material P when narrow-width recording material P and wide-width recording material P are fed continuously in this order. In this case, the narrow-width recording material P is the last recording material P of the preceding print job, and the wide-width recording material P is the first recording material P of the subsequent print job. Therefore, in this case, the same effect as in the example above can be obtained by controlling the back contrast to be increased when the wide-width recording material P in the subsequent paper job is fed. Here, the print condition where "transfer memory" is likely to occur between print jobs is, for example, when the paper interval between print jobs is equivalent to the paper interval in one print job, as described above. In other words, typically, this is the case when multiple print jobs are continuously performed without stopping the rotation of the photosensitive drum 1. However, this is not limited to this. For example, depending on the width and number of sheets of narrow-width recording material P that is passed before the wide-width recording material P (see Embodiments 2 and 3), the effect of uneven charging may remain strong. And if the period corresponding to the paper interval between print jobs is relatively short, the effect of uneven charging caused by the preceding print job may remain in the subsequent print job, even if the photosensitive drum 1 is stopped once between the print jobs. Therefore, even if the photosensitive drum 1 stops once between print jobs, for example, the control may be performed to increase the back contrast when a wide-width recording material P is fed in a subsequent print job according to the time corresponding to the paper interval between print jobs.

Even when narrow-width recording material P and wide-width recording material P are fed consecutively in this order in one print job, there may be cases where the control to increase the back contrast is not performed when feeding wide-width recording material P. For example, the time required for paper feeding may be longer than usual, and the paper interval may be longer than usual. In addition, paper feeding may be intentionally delayed due to time-consuming image processing or other reasons. In these cases, even when narrow-width recording material P and wide-width recording material P are fed continuously in this order in one print job, if the period corresponding to the paper interval between these recording materials P is sufficiently long, the effect of uneven charging may be sufficiently mitigated. Therefore, for example, the control to increase the back contrast may not be performed according to the time corresponding to the paper interval between the above recording materials P.

Thus, in the present embodiment, the image forming apparatus 100 has a rotatable photosensitive member 1, a charging portion 2 that charges the surface of the photosensitive member 1, a charging voltage applying portion E1 that applies a charging voltage to the charging portion for the charging process, and an exposure portion 3 that exposes the charged surface of the photosensitive member 1 to form an electrostatic image on the photosensitive member. It also has a developing member 5*b* that supplies toner to the electrostatic image on the photosensitive member in the developing portion D to form a toner image on the photosensitive member, a developing voltage applying portion E2 that applies a developing voltage to the developing member 5*b* for developing, and a transfer portion 12 that contacts the photosensitive member 1 to form a transfer portion N to transfer the toner image from the photosensitive member 1 to a recording material P passing through the transfer portion N. It also has a transfer voltage applying portion E3 that applies a transfer voltage to the transfer portion 12 for transfer, and a control portion 150 that controls at least one of the charging voltage applying portion E1, developing portion E2, and exposure portion 3. In the present embodiment, the control portion 150 performs transfer to the first recording material P whose width in the direction orthogonal to the feeding direction of the recording material P is the first width when the absolute value of the difference between the potential of the non-image portion of the surface of the photosensitive member 1 in the developing portion D and the developing voltage is the back contrast. Thereafter, the transfer is continuously performed on the second recording material P whose width is the second width that is larger than the above first width. In that case, the back contrast, which is the back contrast formed when the area of the surface of the photosensitive member 1 forming the transfer portion N reaches the developing portion D when the first recording material P above passes through the transfer portion N, is greater than the first back contrast, which is the back contrast formed when the area reaches the developing portion D, can be controlled to be larger. In the present embodiment, the control unit 150 controls the charging voltage applying portion E2 to change the surface potential of the photosensitive member 1 formed by the charging process by the charging portion 2 so that the above second back contrast is larger than the above first back contrast. In the present embodiment, in one print job, which is a series of consecutive transfers to a plurality of recording materials P that is initiated by one start instruction, the control portion 150 performs said transfers to the above first recording material P and the above second recording material P in succession, so that the above second back contrast is greater than the above first back contrast. However, the control portion 150 may perform the control so that the above second back contrast is larger than the above first back contrast when the transfer is performed continuously to the above first recording material P and the above second recording material P without stopping the rotation of the photosensitive member 1. The control portion 150 may also perform the control so that, in the case where the transfer is performed continuously after the transfer is performed on the above second recording material P to a third recording material P whose width is the above second width, the area of the surface of the photosensitive member 1 forming the transfer portion N when the above third recording material P passes through the transfer portion N reaches the developing portion D is greater than the above first back contrast.

As described above, in the present embodiment, when narrow- and wide-width recording materials P are continuously fed in this order, the back contrast is increased when the wide-width recording material P is fed. This can suppress the occurrence of "transfer memory" in the wide-width recording material P. Therefore, according to the present embodiment, the occurrence of "transfer memory" can be suppressed in the case of continuous image forming on recording materials P with different paper widths, while suppressing the adverse effects of the conventional method, such as reduced productivity and increased size and cost of the apparatus.

Next, other embodiments of the present invention are described. The basic configuration and operation of the image forming apparatus in these embodiments are the same as those of the image forming apparatus in Embodiment 1. Therefore, elements of the image forming apparatus in the present embodiment that have the same or corresponding functions or configuration examples as those of the image forming apparatus in Embodiment 1 are marked with the same symbols as in Embodiment 1, and detailed descriptions are omitted.

1. Overview of the Present Embodiment

In Embodiment 1, the control portion 150 controlled the back contrast of the passing area to increase when feeding a narrow-width recording material P and a wide-width recording material P in succession in this order, so that the back contrast when feeding the wide-width recording material P is increased. In the present embodiment, the control portion 150 further controls to change the back contrast when feeding the subsequent wide-width recording material P (hereinafter referred to as "subsequent paper") in accordance with the paper width of the narrow-width recording material P (hereinafter referred to as "preceding paper") that is fed first.

As mentioned above, in the transfer portion N, the current flowing from the transfer roller 12 to the photosensitive drum 1 is higher in the non-passing area where the transfer roller 12 and the photosensitive drum 1 are in direct contact than in the passing area. The current density of the current flowing in the non-passing area changes according to the size of the non-passing area in the transfer portion N. In other words, the current density of the current flowing in the non-passing area varies depending on the paper width, and the wider the paper width, the higher the current density of the current flowing in the non-passing area. Therefore, when continuously feeding a narrow-width preceding paper and a wide-width subsequent paper, the narrower the preceding paper is and the wider the subsequent paper is, the more likely "transfer memory" is to occur. Therefore, the optimum value of the back contrast required to suppress the occurrence of "transfer memory" on the subsequent paper depends on the paper width of the preceding paper. As mentioned above, back contrast is correlated with "fogging." and the larger the back contrast, the worse the "fogging" may become.

Therefore, it is preferable to set the optimal back contrast according to the preceding paper width in order to suppress "fogging" while suppressing the occurrence of "transfer memory".

2. Confirmation of Effectiveness

Next, an evaluation experiment that confirmed the effectiveness of the present embodiment is described.

One set of print jobs consisted of a continuous feeding operation with B5 or A4 size paper as the preceding paper and LTR size paper as the subsequent paper, and an image with 1-dot horizontal lines placed at 50-space intervals was printed on the LTR size paper. When printing on the preceding paper, the developing bias potential was set at −375 V, the non-image portion potential after the charging process was set at −500 V, and the back contrast was set at 125 V. When printing on the subsequent paper, the potential of the developing bias was set to −375 V, and the back contrast was checked by changing the conditions of the back contrast by changing the potential of the non-image portion after the charging process. In this case, the back contrast was changed to 125V, 150V, 175V, 200V, 225V. and 250V.

The occurrence of "transfer memory" and "one-dot reproducibility (whether or not a one-dot horizontal line image can be reproduced without chips or other defects)" were checked on the LTR size paper. The "transfer memory" was evaluated as "X" (poor) when the associated image defect occurred, and as "O" (good) when it did not occur. For "one-dot reproducibility," the case where there was a defect such as a chip in the one-dot horizontal line image was evaluated as X (defective), and the case where there was no defect such as a chip and the image was reproduced was evaluated as O (good). The results of the evaluation experiment are shown in Table 2.

TABLE 2

| | | | B5 size preceding paper | | A4 size preceding paper | |
|---|---|---|---|---|---|---|
| Condition | Post-charge potential | Back contrast | Occurrence of "transfer memory" | "One-dot reproducibility" | Occurrence of "transfer memory" | "One-dot reproducibility" |
| 1 | 500 V | 125 V | X | O | X | O |
| 2 | 525 V | 150 V | X | O | X | O |
| 3 | 550 V | 175 V | O | O | X | O |
| 4 | 575 V | 200 V | O | O | O | O |
| 5 | 600 V | 225 V | O | O | O | O |
| 6 | 625 V | 250 V | O | X | O | X |

The evaluation conditions are described below. As the recording material P (paper), CS-068 (manufactured by Canon) of B5 size with a basis weight of 68 g/m$^2$, CS-068 (manufactured by Canon) of A4 size with a basis weight of 68 g/m$^2$, and Vitality (manufactured by Xerox) of LTR size with a basis weight of 75 g/m$^2$) were used. The above B5 size recording material P is also referred to as "B5 size paper," the above A4 size recording material P as "A4 size paper," and the above LTR size recording material P as "LTR size paper. These recording materials P were left in an environment with a temperature of 15° C. and a humidity of 10% for 2 days, with a moisture content of 3% as measured with a microwave moisture meter Moistrex MX8000 (manufactured by NDC Infrared Engineering Ltd.). The image forming apparatus 100 was installed in an environment with a temperature of 15° C. and a humidity of 10%, and print operations were performed in that environment. The transfer bias applied to the transfer roller 12 when the recording material P was transferred to the transfer portion N was +2500V. The feeding speed of the recording material P was 250 mm/sec, the print speed was 40 sheets/min, and the print operation was performed with 50 mm paper intervals.

As shown in Table 2, when the preceding paper was a B5 size paper, the occurrence of "transfer memory" in the subsequent paper was suppressed when the back contrast was 175 V or higher. On the other hand, when the preceding paper was an A4 size paper, the occurrence of "transfer memory" in the subsequent paper was suppressed when the back contrast was 200 V or higher. When the preceding paper was either a B5 size paper or an A size paper, the "one-dot reproducibility" deteriorated when the back contrast was 250 V or higher.

As mentioned above, the back contrast is correlated with "fogging," and the larger the back contrast, the worse the "fogging" may become. Therefore, in order to suppress "fogging" while suppressing "transfer memory," it is preferable to set the back contrast as small as possible within the range where "transfer memory" can be suppressed.

Therefore, in the present embodiment, the control portion 150 controls the back contrast when feeding a subsequent LTR size paper to be set to 175 V when the preceding paper is B5 size, and to 200 V when the preceding paper is A4 size. In other words, in the present embodiment, the control unit 150 controls the charging bias and controls the non-image portion potential after the charging process so that the back contrast is set to such a value. This allows "one-dot reproducibility" to be maintained in each case where the preceding paper has different paper widths, and "fogging" can be suppressed as well as the occurrence of "transfer memory" can be suppressed.

The amount of change in back contrast according to the preceding paper width described above is an example, and the back contrast may be set according to the recording material P of other paper widths.

3. Operation Steps

The outline of the steps of the print job procedure according to the present embodiment is the same as the outline of the steps of the print job procedure in Embodiment 1 described with reference to FIG. 6. However, in the present embodiment, in S104, the amount of change in back contrast is changed according to the paper width of the preceding paper, narrow-width recording material P. In the present embodiment, the control portion 150 stores information on the paper width of the recording material P on which the image forming was performed in the memory 152. This paper width information can be stored, for example, by successive overwriting.

In addition, the memory 152 stores information indicating the relationship between the preceding paper width and the back contrast as described above, which is set in advance, as table data or the like. Therefore, the control portion 150 can set the back contrast in S104 based on the information of the preceding paper width and the information indicating the above-mentioned relationship.

Thus, in the present embodiment, the control portion 150 controls to change the value of the above second back contrast that is greater than the above first back contrast according to the above first width of the above first recording material P. In the present embodiment, the control portion 150 controls the value of the above second back contrast to be greater than the above first back contrast when the above first width is a second value greater than the above first value.

As described above, in the present embodiment, the back contrast is set to the optimum value according to the width of the preceding paper when a narrow-width preceding paper and a wide-width subsequent paper are fed continuously. This allows "fogging" to be suppressed according to the preceding paper width while also suppressing the occurrence of "transfer memory."

Next, other embodiments of the present invention are described. The basic configuration and operation of the image forming apparatus in these embodiments are the same as those of the image forming apparatus in Embodiment 1. Therefore, elements of the image forming apparatus in the present embodiment that have the same or corresponding functions or configuration examples as those of the image forming apparatus in Embodiment 1 are marked with the same symbols as in Embodiment 1, and detailed descriptions are omitted.

1. Overview of the Present Embodiment

In Embodiment 1, the control portion 150 controlled the back contrast when feeding the narrow-width recording material P and the wide-width recording material P in this order in succession, so that the back contrast when feeding the wide-width recording material P is increased. In the present embodiment, the control portion 150 further controls to change the back contrast when feeding the subsequent paper, a wide-width recording material P, depending on the number of sheets of the preceding paper, a narrow-width recording material P.

As mentioned above, "transfer memory" is caused by uneven charging of the surface of the photosensitive drum 1 resulting from the transfer process, and "transfer memory" is more likely to occur when the paper interval is short during continuous paper feeding.

This is because when the paper interval is short, the uneven charge cannot be alleviated in a single paper interval. If the uneven charge is not alleviated before the next paper is fed, the uneven charge may become larger. As the uneven charge becomes larger, the back contrast required to suppress the occurrence of "transfer memory" also becomes larger. In other words, it is preferable to change the back contrast when feeding subsequent paper, i.e., a wide-width recording material P, depending on the number of sheets of preceding paper, i.e., narrow-width recording material P. This allows the occurrence of "transfer memory" to be more suitably suppressed.

2. Confirmation of Effectiveness

Next, an evaluation experiment that confirmed the effectiveness of the present embodiment is described.

The evaluation conditions are described below. As recording material P (paper), CS-068 (manufactured by Canon) of B5 size with a basis weight of 68 $g/m^2$ and Vitality (manufactured by Xerox) of LTR size with a basis weight of 75 $g/m^2$ were used. The above B5 size recording material P is also referred to as "B5 size paper" and the above LTR size recording material P as "LTR size paper". These recording materials P were left in an environment with a temperature of 15° C. and a humidity of 10% for 2 days, and were used with a moisture content of 3% as measured with a microwave moisture meter Moistrex MX8000 (manufactured by NDC Infrared Engineering Ltd.). The image forming apparatus 100 was installed in an environment with a temperature of 15° C. and a humidity of 10%, and print operations were performed in that environment. The transfer bias applied to the transfer roller 12 when the recording material P was fed to the transfer portion N was +2500V. The feeding speed of the recording material P was 250 mm/sec, the print speed was 40 sheets/min, and the print operation was performed with 50 mm paper intervals.

One set of print jobs consisted of feeding the specified number of sheets of B5 size paper as the preceding paper and then continuously feeding LTR size paper as the subsequent paper, and images with one-dot horizontal lines placed at intervals of 50 spaces were printed on the LTR size paper. The number of sheets of B5 size paper fed was changed to three patterns (1-9 sheets, 10-49 sheets, and 50 or more sheets) to check the effect. When printing on the preceding paper, the developing bias potential was set at −375 V, the non-image portion potential after the charging process was set at −500 V, and the back contrast was set at 125 V. When printing on the subsequent paper, the potential of the developing bias was set to −375V, and the back contrast was checked by changing the condition of back contrast by changing the potential of the non-image portion after the charging process. In this case, the back contrast was changed to 125V, 150V, 175V, 200V, 225V, and 250V.

Then, the occurrence of "transfer memory" and "one-dot reproducibility (whether or not a one-dot horizontal line image can be reproduced without chips or other defects)" were checked on the LTR size paper. The "transfer memory"

was evaluated as "X" (poor) when image defects were observed, and as "O" (good) when no defects were observed. For "one-dot reproducibility," cases in which there were chips or other defects in the one-dot horizontal line image were evaluated as X (poor), and cases in which there were no chips or other defects and the image was reproduced were evaluated as O (good). The results of the evaluation experiment are shown in Table 3.

TABLE 3

| Condition | Post-charge potential | Back contrast | Preceding paper: 1-9 sheets Occurrence of "transfer memory" | Preceding paper: 10-49 sheets Occurrence of "transfer memory" | Preceding paper: 50 sheets or more Occurrence of "transfer memory" | "One-dot reproducibility" |
|---|---|---|---|---|---|---|
| 1 | 500 V | 125 V | X | X | X | O |
| 2 | 525 V | 150 V | X | X | X | O |
| 3 | 550 V | 175 V | O | X | X | O |
| 4 | 575 V | 200 V | O | O | X | O |
| 5 | 600 V | 225 V | O | O | O | O |
| 6 | 625 V | 250 V | O | O | O | X |

As shown in Table 3, when the number of sheets of narrow-width recording material P, the preceding paper, is from 1 to 9, the occurrence of "transfer memory" in the subsequent paper, the wide-width recording material P, is suppressed when the back contrast is 175 V or higher. When the number of sheets of narrow-width recording material P, the preceding paper, was from 10 to 49, the occurrence of "transfer memory" in the subsequent paper, the wide-width recording material P, was suppressed when the back contrast was 200 V or higher. When the number of sheets of narrow-width recording material P, the preceding paper, was 50 or more (50 sheets in this case), the occurrence of "transfer memory" in the subsequent paper, the wide-width recording material P, was suppressed when the back contrast was 225 V or higher. In addition, "one-dot reproducibility" deteriorated when the back contrast was 250 V or higher for any number of sheets of narrow-width recording material P, which is the preceding paper. This result indicates that as the number of sheets of the preceding paper increases, the back contrast required to suppress the occurrence of "transfer memory" in the subsequent paper becomes larger.

As mentioned above, the back contrast is correlated with "fogging," and the larger the back contrast, the worse the "fogging" may become. Therefore, in order to suppress "fogging" while suppressing "transfer memory," it is preferable to set the back contrast as small as possible within the range where "transfer memory" can be suppressed.

Therefore, in the present embodiment, the control portion 150 controls the back contrast to be set to 175V when feeding subsequent paper, the wide-width recording material P, when the number of sheets of narrow-width recording material P, which is the preceding paper, is 1 to 9. When the number of sheets of narrow-width recording material P, the preceding paper, is 10 to 49, the back contrast is controlled to be set to 200 V when the subsequent paper, the wide-width recording material P, is fed. When the number of sheets of narrow-width recording material P, the preceding paper, is 50 or more, the back contrast is controlled to be set at 225V when the subsequent paper, the wide-width recording material P, is fed. In other words, in the present embodiment, the control portion 150 controls the charging bias to set the back contrast to such a value and controls the non-image portion potential after the charging process. As a result, even when the number of sheets of narrow-width recording material P, which is the preceding paper, is increased, "one-dot reproducibility" is maintained and "fogging" is suppressed, while "transfer memory" is also suppressed.

3. Operation Steps

The outline of the procedure for a print job according to the present embodiment is the same as the outline of the procedure for a print job in Embodiment 1 described with reference to FIG. 6. However, in this embodiment, in S104, the amount of change in back contrast is changed according to the number of sheets of narrow-width recording material P, which is the preceding paper. In the present embodiment, the control portion 150 accumulates and stores the number of sheets fed into the memory 152, which functions as a counter, for each paper width of the recording material P each time image forming is performed on the recording material P.

In addition, the memory 152 stores information indicating the relationship between the number of sheets fed and the back contrast of the preceding paper, which is a narrow-width recording material P, as described above, which has been set in advance, as table data or the like. Therefore, in S104, the control portion 150 can set the back contrast based on the information on the number of sheets of narrow-width recording material P, which is the preceding paper, and the information indicating the above relationship. When the control to increase the back contrast is performed, the information on the number of sheets per paper width stored in the memory 152 as the above counter is reset to an initial value (e.g., 0).

Here, as explained in Embodiment 1, typically, the control portion 150 controls the back contrast to be increased for only one sheet of recording material P after switching the back contrast. However, the present invention is not limited to such an approach, and the back contrast may be controlled to be increased for multiple sheets of recording material P after the back contrast is switched. For example, depending on the number of sheets of narrow-width recording material P, which is the preceding paper, the uneven charge generated by image formation on the preceding paper may not be alleviated by the charging process for one sheet of recording material P. For example, the back contrast may be increased for multiple sheets of recording material P after switching the back contrast. Therefore, for example, depending on the number of sheets of narrow-width recording material P, which is the preceding paper, the back contrast may be controlled to be increased for multiple sheets of recording material P after the recording material P is switched, which is preset so that uneven charge can be alleviated. In this case, information indicating the relationship between the number of sheets of narrow-width recording material P, the preceding paper, and the number of sheets of wide-width recording material P, the subsequent paper, for which the back contrast is increased, can be stored in the memory 152 in advance as table data or the like.

The control by paper width described in Embodiment 2 may be combined with the control by the number of sheets fed described in the present embodiment. For example, the more sheets of narrow-width recording material P, the preceding paper, if the paper width is the same, or the wider the paper width if the number of sheets is the same, the greater the back contrast when the subsequent paper, the wide-width recording material P, is fed.

Thus, in the present embodiment, the control portion 150 controls to change the value of the above second back contrast greater than the above first back contrast according to the number of sheets of the above first width of the recording materials P that were continuously transferred before the transfer portion was transferred to the above second recording material P. In the present embodiment, the control portion 150 controls the value of the above second back contrast to be greater than the above first back contrast when the above number of sheets is greater than the above first number of sheets.

As described above, in the present embodiment, when the narrow-width preceding paper and the wide-width subsequent paper are fed consecutively, the back contrast is set to the optimum value according to the number of sheets of the narrow-width recording material P, which is the preceding paper. This allows "fogging" to be suppressed according to the number of sheets of narrow-width recording material P, the preceding paper, being fed, while also suppressing the occurrence of "transfer memory."

Next, another embodiment of the present invention is described. The basic configuration and operation of the image forming apparatus in the present embodiment are the same as those of the image forming apparatus in Embodiment 1. Therefore, elements of the image forming apparatus in the present embodiment that have the same or corresponding functions or configuration examples as those of the image forming apparatus in Embodiment 1 are marked with the same symbols as in Embodiment 1, and detailed descriptions are omitted.

In the present embodiment, the image forming apparatus 100 optimizes the potential of the photosensitive drum 1 by emitting a small amount of light from an exposure unit (laser scanner) 3 in the non-image portion (non-toner image forming portion) of the surface of the photosensitive drum 1 to the extent that excess toner does not adhere to the photosensitive drum 1. This weak exposure of the non-image portions (non-toner image forming portions) is called "background exposure". For the background exposure itself, for example, available methods and configurations in the public domain can be used as appropriate.

In the present embodiment, a laser scanner capable of simultaneously performing background exposure (weak exposure, first output, first laser power) and normal exposure for image forming (second output, second laser power) is used as the exposure unit 3. In the present embodiment, the surface of the photosensitive drum 1 is uniformly charged to −600 V by the charging roller 2 during image formation. In addition, in the present embodiment, the image area potential of the surface of the photosensitive drum 1 is about −125 V after being uniformly charged and exposed normally with a laser by the exposure unit 3. In the present embodiment, the background exposure potential (non-image part potential) of the surface of the photosensitive drum 1 after it has been uniformly charged and background-exposed with a laser by the exposure unit 3 is about −500 V. In this case, the background exposure potential can be adjusted by changing the amount of background exposure. In the present embodiment, the toner is charged negatively in the developing unit 5. In addition, in the present embodiment, a DC voltage of −375 V is applied to the developing roller 5*b* as the developing bias during image formation.

In the present embodiment, the absolute value of the difference between the background exposure potential and the developing bias potential is the back contrast. Therefore, if the background exposure amount is reduced, the background exposure potential becomes smaller and the back contrast becomes larger. For the same background exposure amount, the background exposure potential is also smaller and the back contrast is larger when the potential of the non-image area after the charging process is lowered.

As explained in the above embodiment, the occurrence of "transfer memory" can be suppressed by increasing the back contrast when feeding the narrow-width recording material P and the wide-width recording material P in this order in succession, and by increasing the back contrast when feeding the wide-width recording material P. As explained in the above embodiment, it is preferable to set the back contrast as small as possible in order to suppress "fogging".

Therefore, in the present embodiment, the control portion 150 increases the back contrast only in the non-passing area corresponding to the passing area of the preceding paper, which is the narrow-width recording material P, and the passing area of the subsequent paper, which is the wide-width recording material P, when the subsequent paper, which is the wide-width recording material P, is fed through. The following is a more detailed explanation.

Figure 7:
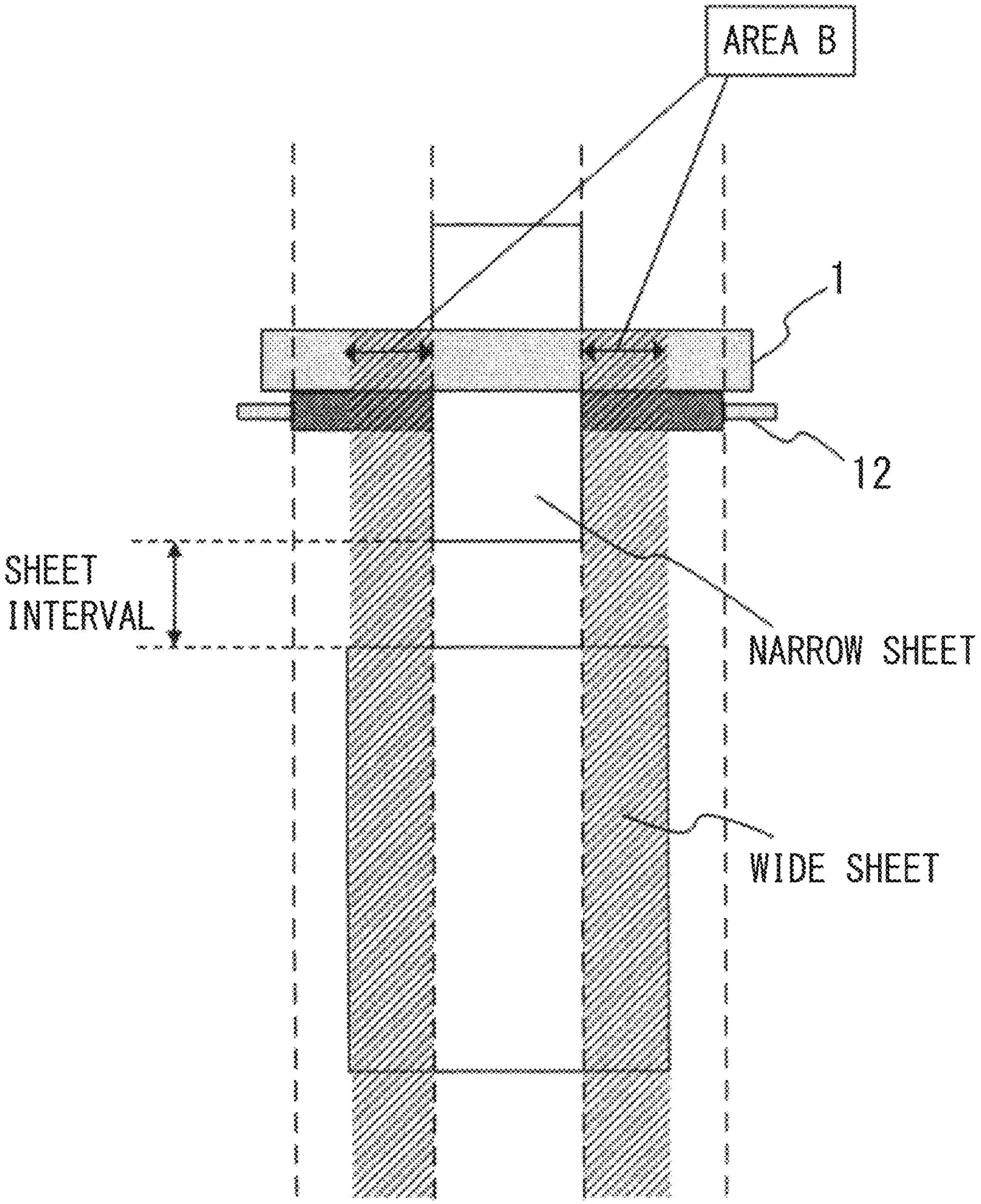
FIG. 7 is a schematic drawing showing the transfer portion to explain Embodiment 4.

FIG. 7 is a schematic drawing showing the transfer portion N in the case of passing areas of narrow-width recording material P and wide-width recording material P in succession. Area B in FIG. 7 is an area on the photosensitive drum 1 corresponding to the non-passing area in the transfer portion N when the narrow-width recording material P is fed and corresponding to the passing area in the transfer portion N when the wide-width recording material P is fed, with respect to a direction that is orthogonal to the feeding direction of the recording material P in the transfer portion N. In the present embodiment, the back contrast is increased only in area B when a subsequent paper, wide-width recording material P, is fed. This minimizes "fogging" and suppresses the occurrence of "transfer memory". Specifically, the non-passing area potential of the photosensitive drum 1 after the charging process is set to −600 V both when the preceding paper, narrow-width recording material P, is fed and when the subsequent paper, wide-width recording material P, is fed. Then, when the subsequent paper, the wide-width recording material P, is fed, only in area B, the background exposure is reduced (turned off in the present embodiment), the background exposure potential is −600 V, and the back contrast is set to 225 V. When a subsequent paper, a wide-width recording material P, is fed, the background exposure amount is increased (turned on at a predetermined range) in areas other than area B, the background exposure potential is set to −500 V, and the back contrast is set to 125 V. In the present embodiment, the background exposure is turned off when the background exposure amount is reduced, but the exposure amount can be reduced to form the desired potential.

In Embodiment 1, the back contrast was increased in area A in FIG. 4. On the other hand, in the present embodiment, the area where the back contrast is increased is limited to area B, which is narrower than area A in Embodiment 1. This minimizes "fogging" while suppressing the occurrence of "transfer memory".

Thus, in Embodiment 2, the exposure unit 3 exposes the charged surface of the photosensitive member 1 with a first output forming the potential of the non-image portion and a second output forming the potential of the image forming portion. The electrostatic image is then formed on the photosensitive member, and the control portion 150 does not contact the above first recording material P in the transfer portion N of the above second back contrast. In addition, the control portion 150 controls the exposure portion 3 to change the above first output so that only the above second back contrast in the area of the surface of the photosensitive member 1 that contacts the above second recording material P in the transfer portion N is greater than the above first back contrast.

As described above, in the present embodiment, when continuously feeding the narrow-width preceding paper and wide-width subsequent paper, the back contrast is increased only in the non-passing area corresponding to the passing area of the narrow-width preceding paper and the passing area of the wide-width subsequent paper, when feeding the wide-width recording material P, which is the subsequent paper. This minimizes the occurrence of "fogging" and suppresses the occurrence of "transfer memory".

Although the present invention has been described above in terms of specific embodiments, the present invention is not limited to the above embodiments.

For example, in the above embodiments, the image forming apparatus was a monochrome image forming apparatus with one image forming portion, but the present invention can be applied, for example, to a tandem type image forming apparatus with multiple image forming portions, employing a direct transfer system. As is well known to those skilled in the art, this image forming apparatus forms toner images of different colors in the same manner as in the above embodiments in plural image forming portions, each of which is equipped with a photosensitive member. The toner images formed in the plural image forming portions are sequentially transferred in such a way that they are superimposed on a recording material carried on a recording material carrier, such as a recording material carrier belt composed of an endless belt, and then fed. This transfer is often performed by applying a transfer voltage to a roller or the like that is in contact with the inner circumference of the recording material carrier. In this case, the above-mentioned recording material carrier and the above-mentioned roller can be regarded as constituting the transfer member. The recording material on which the toner image has been transferred is ejected from the image forming apparatus after being subjected to a fixing portion in the same manner as in the embodiments described above. In such an image forming apparatus, "transfer memory" may occur in each image forming portion due to uneven charge on the surface of the photosensitive member in each image forming portion caused by the transfer process in the transfer portion of each image forming portion. Therefore, in such an image forming apparatus, the same back contrast control as in the above embodiments can be performed in each image forming portion, and the same effect of suppressing the occurrence of "transfer memory" can be obtained as in the above embodiments.

In the above embodiments, the image forming apparatus was not provided with a pre-charging exposure unit. According to the present invention, it is possible to suppress the occurrence of "transfer memory" with a simple configuration without providing a pre-charging exposure unit. However, the present invention can be applied even when the image forming apparatus is provided with a pre-charging exposure unit. In this case, by applying the present invention, it is possible to suppress the occurrence of "transfer memory" while reducing the amount of exposure light by the pre-charging exposure unit and to simplify the configuration of the pre-charging exposure unit.

The configuration example with background exposure may be used to control a larger back contrast in the same area on the photosensitive member as in Embodiment 1.

In the above embodiments, the photosensitive member was a rotatable drum-like member, but it could also be a belt-like member supported by a plurality of supporting rollers.

In the above embodiments, the charging potential (charging bias) of the photosensitive member was changed to change the back contrast, but the developing bias may also be changed, or both the charging potential (charging bias) and developing bias of the photosensitive member may be changed. When the developing bias is changed, it is desirable to also change the exposure amount so that the developing contrast, which is the absolute value of the difference between the image developing portion potential of the photosensitive member and the developing bias, is maintained (the change in developing contrast due to a change in developing bias should be small).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-188231, filed Nov. 18, 2021, which is hereby incorporated by reference herein in its entirety.

What is claimed is:

1. An image forming apparatus comprising:

a rotatable photosensitive member;

a charging roller configured to perform a charging process of a surface of the photosensitive member;

a charging voltage power source configured to apply a charging voltage for the charging process to the charging roller;

an exposure portion configured to expose the charging processed surface of the photosensitive member and to form an electrostatic image on the photosensitive member;

a developing member configured to supply toner to the electrostatic image on the photosensitive member at a developing portion and to form a toner image on the photosensitive member;

a developing voltage power source configured to apply a developing voltage for the developing to the developing member;

a transfer member configured to form a transfer portion by contacting the photosensitive member and to transfer the toner image to a recording material passing through the transfer portion from the photosensitive member;

a transfer voltage power source configured to apply a transfer voltage for the transfer to the transfer member; and a control portion configured to control at least one of the charging voltage power source, the developing voltage power source and the exposure portion, wherein an absolute value of a difference between a potential of a non-image portion of the surface of the photosensitive member at the developing portion and a potential of the developing voltage is defined as a back contrast, and wherein, in a case which the transfer is performed to a first recording material of which width in a direction substantially perpendicular to a feeding direction of the recording material is a first width, and thereafter, the transfer is successively performed to a second recording material of which width is a second width longer than the first width, the control portion controls a first back contrast which is the back contrast to be formed when an area of the surface of the photosensitive member corresponding to the transfer portion through which the first recording material is passing reaches the developing portion, and a second back contrast which is the back contrast to be formed when an area of the surface of the photosensitive member corresponding to the transfer portion through which the second recording material is passing reaches the developing portion so that the second back contrast is higher than the first back contrast.

2. The image forming apparatus according to claim 1, wherein the control portion controls the charging voltage power source to change a surface potential of the photosensitive member formed by the charging process of the charging roller so that the second back contrast is higher than the first back contrast.

3. The image forming apparatus according to claim 1, wherein the exposure portion exposes the charging processed surface of the photosensitive member with a first output for forming the potential of the non-image portion and a second output for forming a potential of an image portion, and forms the electrostatic image on the photosensitive member, and wherein the control portion controls the exposure portion to change the first output so that, of the second back contrast, only the second back contrast in the area of the surface of the photosensitive member which does not contact the first recording material at the transfer portion and contacts the second recording material at the transfer portion is higher than the first back contrast.

4. The image forming apparatus according to claim 1, wherein the control portion controls to change a value of the second back contrast higher than the first back contrast according to the first width.

5. The image forming apparatus according to claim 4, wherein the control portion controls so that the value of the second back contrast higher than the first back contrast becomes higher in a case in which the first width is a second value greater than a first value than in a case in which the first width is the first value.

6. The image forming apparatus according to claim 1, wherein the control portion controls to change a value of the second back contrast higher than the first back contrast according to a number of the first recording material of which width is the first width and to which the transfer is successively performed before the transfer is performed to the second recording material.

7. The image forming apparatus according to claim 6, wherein the control portion controls so that the value of the second back contrast higher than the first back contrast becomes higher in a case in which the number is a second number greater than a first number than in a case in which the number is the first number.

8. The image forming apparatus according to claim 1, wherein, in a single print job which is a series of operations which is started by a single start instruction and in which the transfer is successively performed to a plurality of the recording material, the control portion controls so that the second back contrast is higher than the first back contrast in a case that the transfer is successively performed to the first recording material and the second recording material.

9. The image forming apparatus according to claim 1, wherein the control portion controls so that the second back contrast is higher than the first back contrast in a case that the transfer is successively performed to the first recording material and the second recording material without stopping rotation of the photosensitive member.

10. The image forming apparatus according to claim 1, wherein, in a case which the transfer is performed to the second recording material, and thereafter, the transfer is successively performed to a third recording material of which width is the second width, the control portion controls so that a third back contrast which is the back contrast to be formed when an area of the surface of the photosensitive member corresponding to the transfer portion through which the third recording material is passing reaches the developing portion is higher than the first back contrast.

* * * * *